(12) United States Patent
Moriyama et al.

(10) Patent No.: US 8,160,376 B2
(45) Date of Patent: Apr. 17, 2012

(54) IMAGE COMPRESSION APPARATUS

(75) Inventors: Masahiro Moriyama, Osaka (JP);
Yujiro Tani, Osaka (JP); Yusuke Mizuno, Osaka (JP); Hideki Daian, Osaka (JP); Nobuhiro Minami, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 586 days.

(21) Appl. No.: 12/408,901

(22) Filed: Mar. 23, 2009

(65) Prior Publication Data

US 2010/0104206 A1 Apr. 29, 2010

(30) Foreign Application Priority Data

Oct. 29, 2008 (JP) .................................. 2008-277743

(51) Int. Cl.
*G06K 9/46* (2006.01)
(52) U.S. Cl. ........ 382/244; 382/232; 382/233; 382/248; 382/251
(58) Field of Classification Search .................. 382/166, 382/232, 233, 251, 244, 248; 342/367; 381/2; 341/67; 375/130, 147, 335, 299, 347, 141, 375/144, 295, E1.033; 358/518, 519; 348/E5.105
See application file for complete search history.

(56) References Cited

U.S. PATENT DOCUMENTS

| 5,818,970 A * | 10/1998 | Ishikawa et al. ............... 382/248 |
| 7,356,190 B2 * | 4/2008 | Mizoguchi et al. ........... 382/233 |
| 7,542,615 B2 * | 6/2009 | Mizoguchi et al. ........... 382/233 |

OTHER PUBLICATIONS

U.S. Appl. No. 12/408,924, filed Mar. 23, 2009, Tani, et al.
"HD Photo-Photographic Still Image File Format", Bitstream Specification, Microsoft Corporation, Version 1.0 URL: http://www.microsoft.com/whdc/xps/hdphotodpk.mspx, Nov. 7, 2006, 73 pages.
"Coding of Still Pictures", International Organization for Standardisation and International Electrotechnical Commission, URL: http://www.itscj.ipsj.or.jp/sc29/open/29view/29n9026t.doc, Dec. 19, 2007, 151 pages.

* cited by examiner

*Primary Examiner* — Anh Hong Do
(74) *Attorney, Agent, or Firm* — Oblon, Spivak, McClelland, Maier & Neustadt, L.L.P.

(57) ABSTRACT

An image compression apparatus performs quantization of DC component data, low-pass component data and high-pass component data which are generated by frequency conversion of still image data. An extracting part extracts additional data and coding object data which is to be entropy coded, from quantization data. An entropy coding part performs entropy coding of the coding object data stored in a coding object data memory. An additional data processing part generates a flex bit from the additional data. A pattern information generation part acquires the coding object data directly from the extracting part, to generate pattern information indicating whether the coding object data is zero or not. A bit stream generation part outputs the pattern information, the coding object data and the flex bit in a predetermined order, to output a bit stream.

5 Claims, 8 Drawing Sheets

EXTRACT DA01 TO DA16

AFTER SECOND PCT CONVERSION

| B01 | B02 | B03 | B04 | B05 | B06 | B07 | B08 | B09 | B10 | B11 | B12 | B13 | B14 | B15 | B16 |

FIG. 7B

| B01 | B04 | B09 | B06 | B03 | B15 | B07 | B08 | B05 | B10 | B13 | B14 | B11 | B12 | B02 | B16 |

FIG. 8

| | Y CHANNEL | | | | U CHANNEL | | | V CHANNEL | | |
|---|---|---|---|---|---|---|---|---|---|---|
| ADDRESS | A01 | A02 | A15 | A16 | A17 | A18 | A32 | A33 | A34 | A48 |
| PATTERN VALUE | 0 | 0 | 0 | 0 | 0 | 0 | 0 | 0 | 0 | 0 |
| CORRESPONDING BLOCK | B01 | B04 | B02 | B16 | B01 | B04 | B16 | B01 | B04 | B16 |

IMAGE COMPRESSION APPARATUS

BACKGROUND OF THE INVENTION

1. Field of the Invention

The present invention relates to an image compression apparatus for compressing still image data.

2. Description of the Background Art

As formats for compressing still image data, conventionally, the JPEG (Joint Photographic Experts Group) format has been widely used. Further, the HD Photo format which allows prevention of degradation of images and ensures high compression ratio, as compared with the JPEG format, has been developed. The HD Photo format is discussed in detail in Non-Patent Documents, such as "HD Photo—Photographic Still Image File Format" (Nov. 7, 2006, Microsoft Corporation, URL: http://www.microsoft.com/whdc/xps/hdphotodp-k.mspx) and "Coding of Still Pictures" (Dec. 19, 2007, International Organisation for Standardisation and International Electorotechnical Commission, URL: http://www.itscj.ipsj.orjp/sc29/open/29view/29n9026t.doc)

An image compression apparatus based on the HD Photo format (hereinafter, referred to simply as an "image compression apparatus") performs frequency conversion of an original image data on a macroblock-by-macroblock basis, to generate DC (direct current) component data and two types of AC (alternating current) component data. One of the two types of AC component data is low-pass component data called "Low Pass" and the other one is high-pass component data called "High Pass". The image compression apparatus performs quantization and predictive coding of these component data, to generate DC quantization data, low-pass quantization data and high-pass quantization data.

A quantization data of each component is divided into coding object data which is to be entropy coded and additional data which is not to be entropy coded. The image compression apparatus generates coded data from the coding object data by entropy coding, to generate compressed image data. Thus, since the object for entropy coding is limited in the HD Photo format, the load of the image compression process is suppressed.

Figure 9:
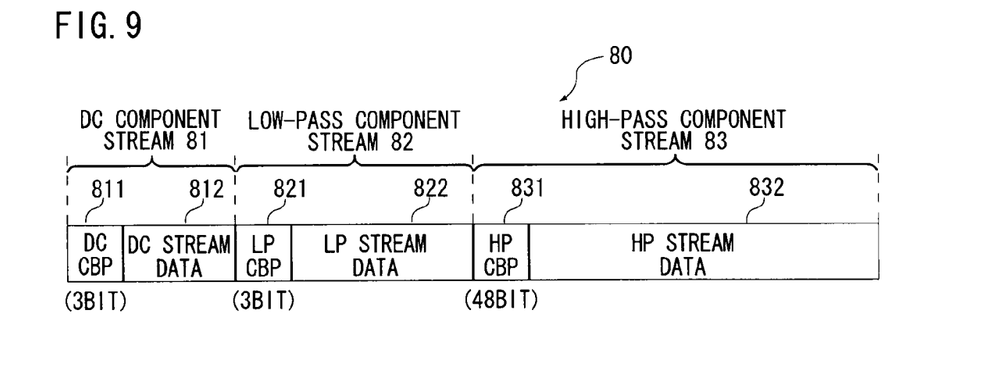
FIG. 9 is a schematic diagram showing a structure of a bit stream in the HD Photo format.

FIG. 9 is a schematic diagram showing a bit stream 80 forming the compressed image data in the HD Photo format. In the HD Photo format, the original image data is processed by the macroblock consisting of 16×16 pixels and the bit stream 80 corresponding to the macroblock is thereby generated.

The bit stream 80 includes a DC component stream 81, a low-pass component stream 82 and a high-pass component stream 83. The DC component stream 81 consists of pattern information 811 and stream data 812. The low-pass component stream 82 consists of pattern information 821 and stream data 822. The high-pass component stream 83 consists of pattern information 831 and stream data 832.

Each of the pattern information 811, 821 and 831 is called "cbp (Code Block Pattern)", which indicates whether the coding object data of its corresponding component is zero or not. Each of the stream data 812, 822 and 832 consists of the coded data of its corresponding component and a flex bit generated from the additional data of its corresponding component.

Figure 10:
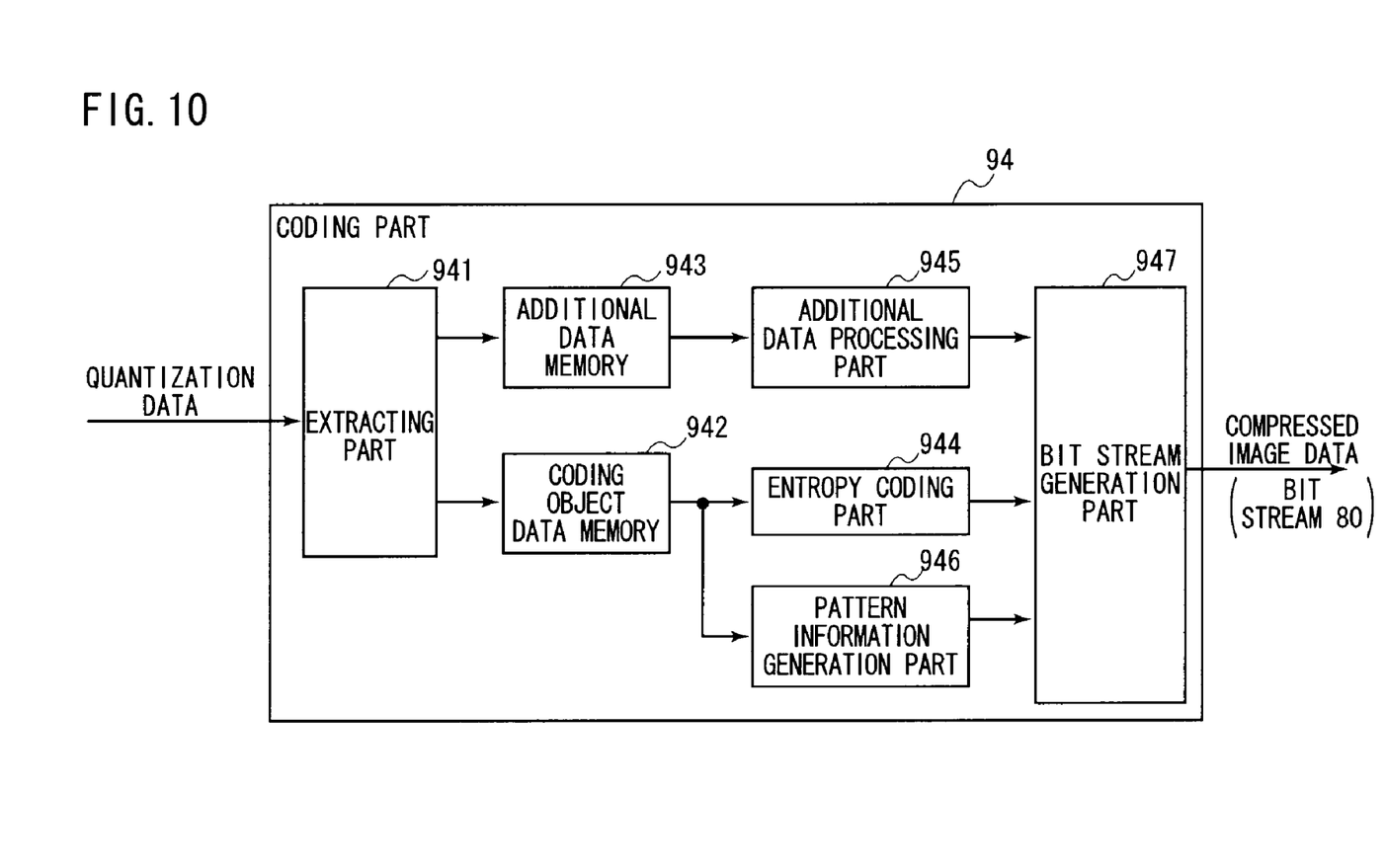
FIG. 10 is a view showing a constitution of a coding part of an image compression apparatus in the background art.

FIG. 10 is a view showing a constitution of a coding part 94 of an image compression apparatus in the background art. The coding part 94 generates the bit stream 80 from the quantization data of each component. The coding part 94 comprises an extracting part 941, a coding object data memory 942, an additional data memory 943, an entropy coding part 944, an additional data processing part 945, a pattern information generation part 946 and a bit stream generation part 947.

The operation of the coding part 94 will be discussed, taking a case where the low-pass quantization data having fifteen pieces of quantization factor data is inputted, as an example. The extracting part 941 extracts low order data having a predetermined data length out of each quantization factor data and writes the low order data into the additional data memory 943 as low-pass additional data. Further, the extracting part 941 extracts data (high order data) other than the low order data out of each quantization factor data and writes the high order data into the coding object data memory 942 as low-pass coding object data.

The entropy coding part 944 reads the low-pass coding object data out from the coding object data memory 942 and performs entropy coding thereon to generate the low-pass coded data. The additional data processing part 945 arranges the fifteen pieces of low order data written in the additional data memory 943 in a predetermined order, to generate a low-pass flex bit. The pattern information generation part 946 reads the low-pass coding object data out from the coding object data memory 942 and checks if each high order data is zero or not, to generate the pattern information 821. The bit stream generation part 947 outputs the pattern information 821, the low-pass coded data and the low-pass flex bit in this order, to generate the low-pass component stream 82.

Figure 11:
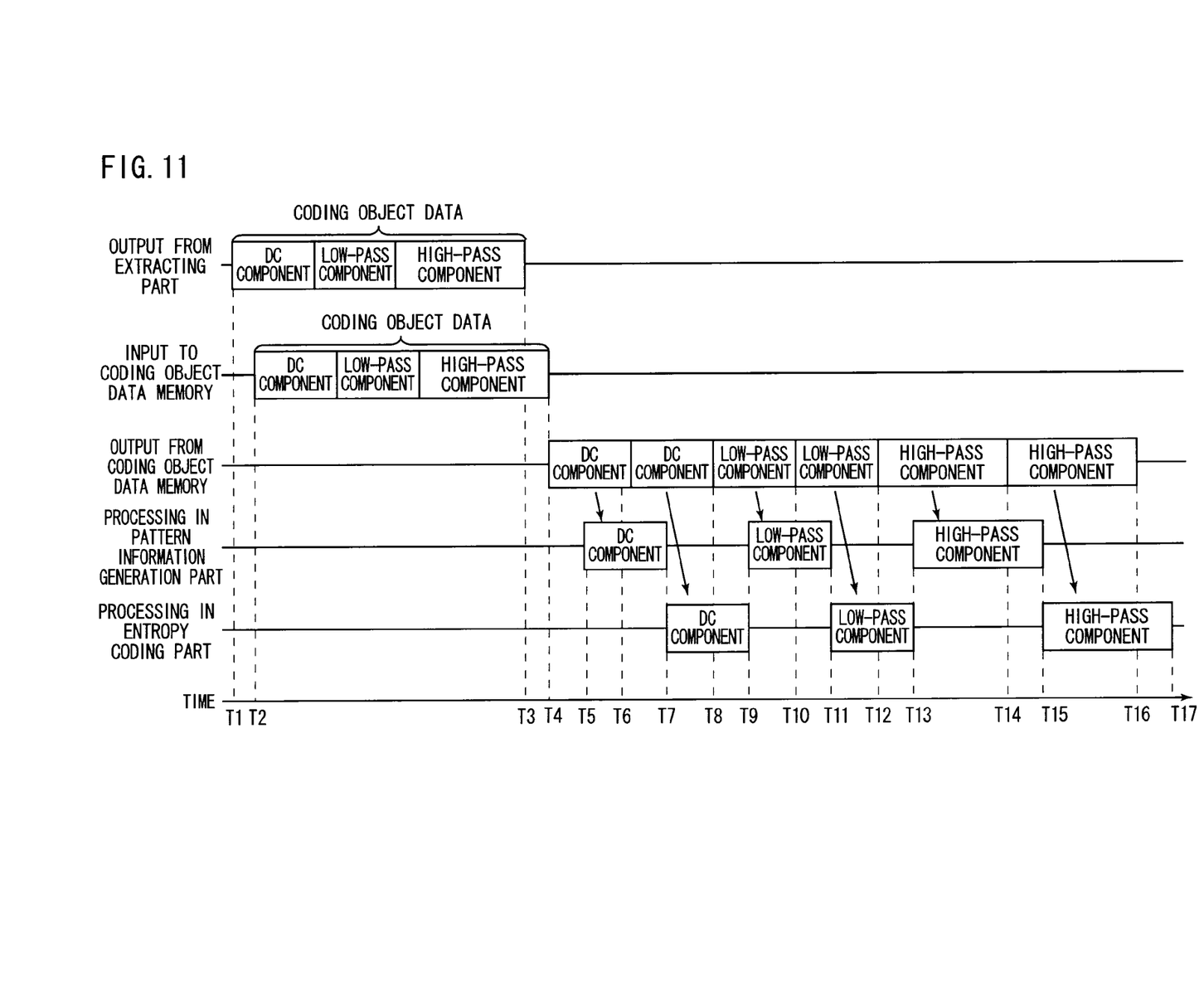
FIG. 11 is a chart showing an operation timing in the coding part of the image compression apparatus in the background art.

FIG. 11 is a time chart showing an operation timing of each data in the coding part 94. In a case, for example, where the coding part 94 processes the low-pass quantization data, the pattern information generation part 946 reads the low-pass coding object data out from the coding object data memory 942 during the period from the time T8 to the time T10 and generates the pattern information 821 during the period from the time T9 to the time T11. This is because the pattern information 821 needs to be generated first since the pattern information 821 is arranged before the stream data 822 consisting of the low-pass coded data and the low-pass flex bit.

The entropy coding part 944 can not access the coding object data memory 942 during the period from the time T8 to the time T10, falling into a standby state. The entropy coding part 944 starts to read the low-pass coding object data from the time T11 when the pattern information generation part 946 finishes reading of the low-pass coding object data. Similarly, the entropy coding part 944 falls into the standby state also during the period from the time T4 to the time T6 while the pattern information generation part 946 reads out the DC coding object data and during the period from the time T12 to the time T14 while the pattern information generation part 946 reads the high-pass coding object data.

Further, the pattern information generation part 946 can not access the coding object data memory 942 during the periods (from the time T6 to the time T8, from the time T10 to the time T12 and from the time T14 to the time T16) while it reads the coding object data out from the entropy coding part 944, falling into the standby state.

Thus, in the image compression apparatus having the coding part 94, since there occurs a standby time in the entropy coding part 944 and the pattern information generation part 946, this disadvantageously causes a delay in generation of the bit stream 80.

SUMMARY OF THE INVENTION

The present invention is intended for an image compression apparatus for compressing original image data. According to an aspect of the present invention, the image compression apparatus comprises a frequency converter for performing frequency conversion of original image data on a macroblock-by-macroblock basis to generate frequency conversion data, a quantization part for performing quantization of the frequency conversion data to generate quantization data, and a coding part for generating coded data from the quantization data to output stream data including the coded data, and in the image compression apparatus of the present invention, the coding part includes an extracting part for extracting coding object data which is to be entropy coded, from the quantization data, a memory part for storing the coding object data extracted by the extracting part, an entropy coding part for reading the coding object data out from the memory part and performing entropy coding of the coding object data which is read out, to generate the coded data, a pattern information generation part for acquiring the coding object data from the extracting part to generate pattern information indicating whether the value of the coding object data is "0" or not, and an output part for outputting the pattern information and the coded data in a predetermined order, to output the stream data.

By the present invention, since the standby state of the entropy coding part, which occurs in generating the pattern information, is canceled, it is possible to efficiently compress the original image data.

According to another aspect of the present invention, the entropy coding part performs entropy coding of first coding object data corresponding to a first macroblock and then performs entropy coding of second coding object data corresponding to a second macroblock, and the pattern information generation part generates pattern information corresponding to the second coding object data during the period while the first coding object data is entropy coded.

The entropy coding part can start the processing of the second coding object data without waiting for generation of the pattern information corresponding to the second coding object data. Therefore, it is possible to more efficiently compress the original image data.

Therefore, it is an object of the present invention to provide an image compression apparatus which allows an increase in efficiency of compression on still image data.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
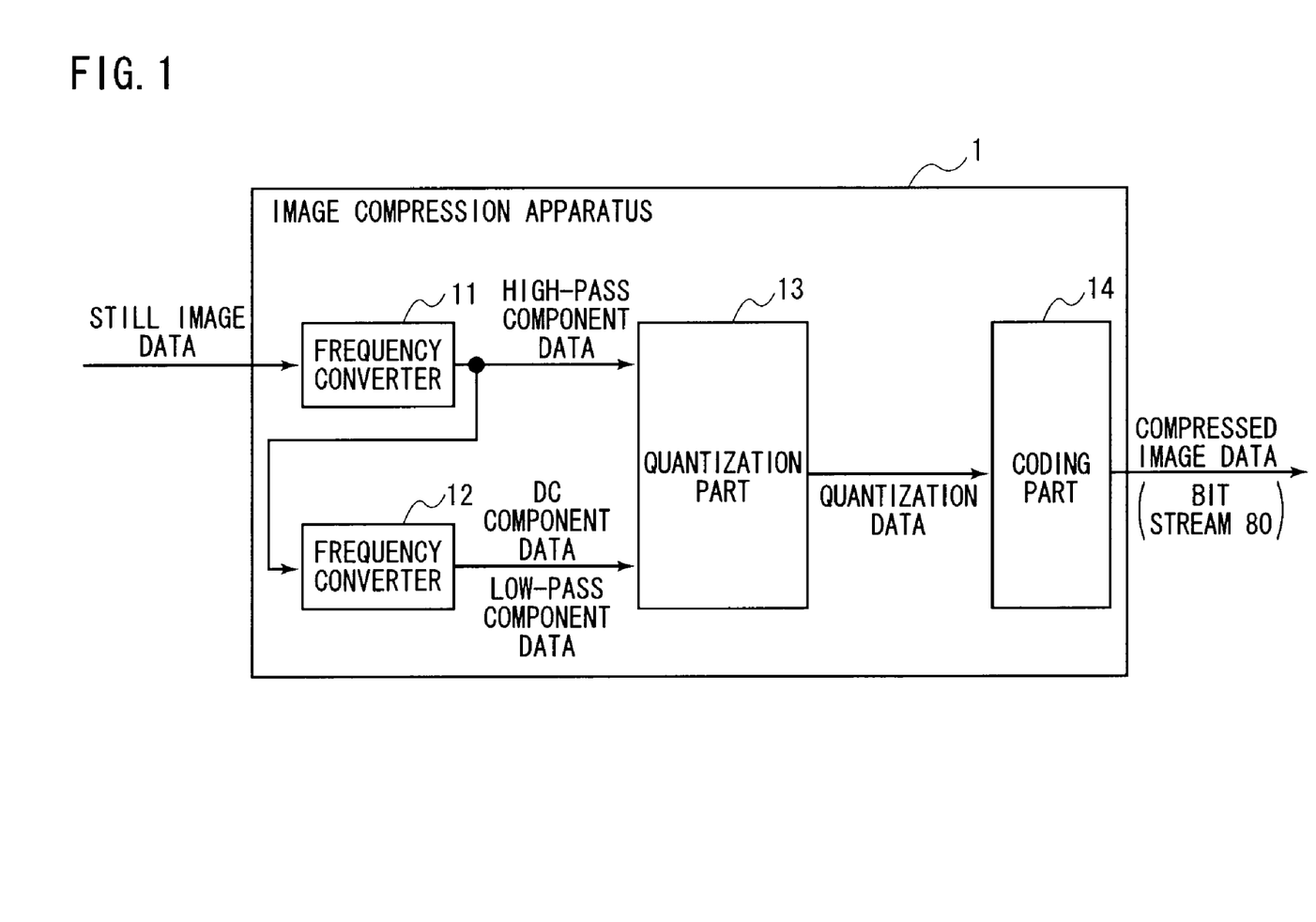
FIG. 1 is a block diagram showing a constitution of an image compression apparatus in accordance with a preferred embodiment of the present invention.

Hereinafter, referring to figures, the preferred embodiment of the present invention will be discussed. FIG. 1 is a block diagram showing a constitution of an image compression apparatus 1 in accordance with the preferred embodiment of the present invention. The image compression apparatus 1 of FIG. 1 is an apparatus for converting still image data into compressed image data in the HD Photo format. The image compression apparatus 1 comprises frequency converters 11 and 12, a quantization part 13 and a coding part 14.

Figure 3:
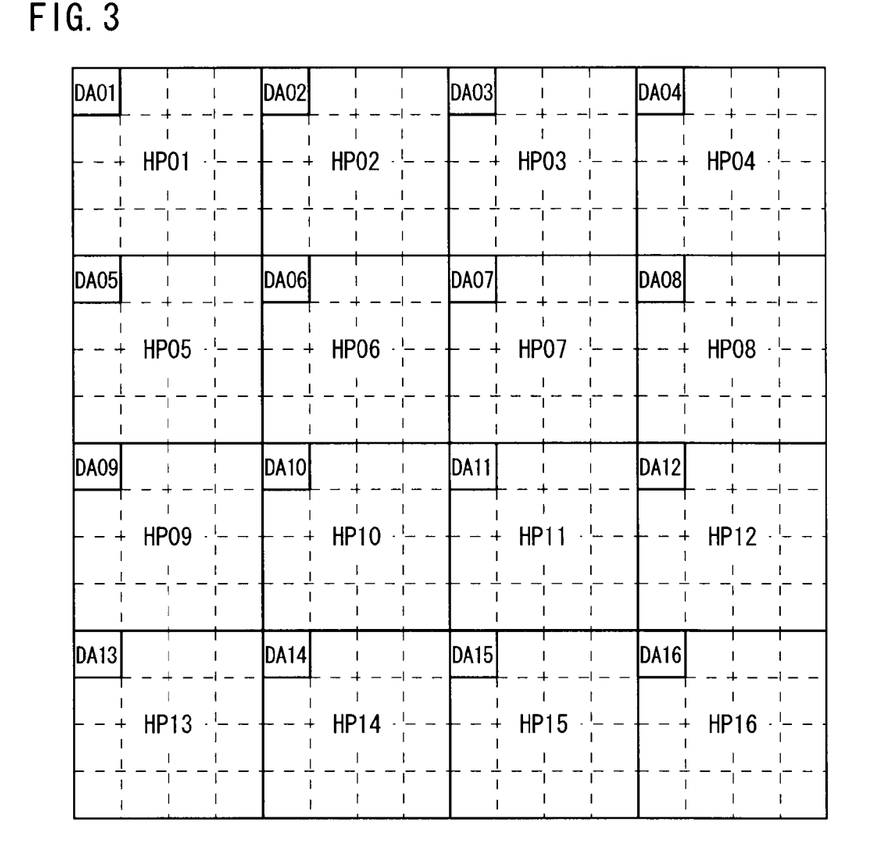
FIG. 3 is a view showing high-pass component data and DC component data of the first hierarchy.

The frequency converter 11 performs frequency conversion of the first hierarchy on the still image data inputted by the image compression apparatus 1, to output DC (direct current) component data of the first hierarchy DA01 to DA16 (see FIG. 3) and AC (alternating current) component data of the first hierarchy HP01 to HP16 (see FIG. 3). The AC component data of the first hierarchy HP01 to HP16 correspond to a "High Pass" component in the HD Photo format. Hereinafter, the AC component data of the first hierarchy is referred to as "high-pass component data".

Figure 4:
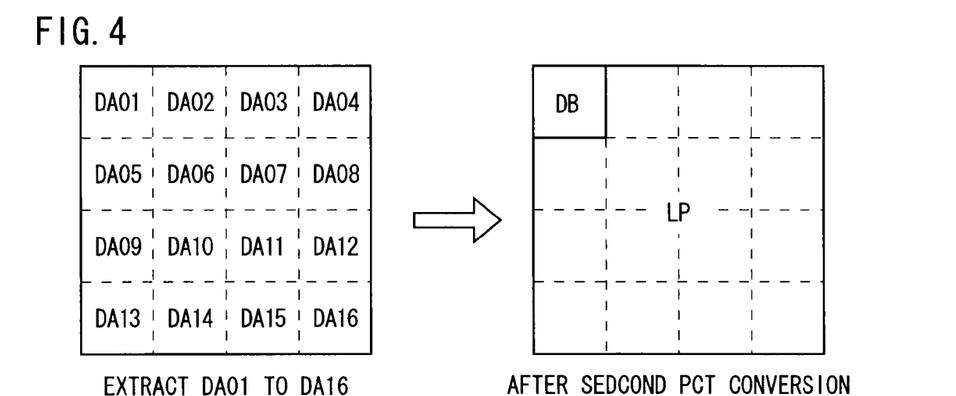
FIG. 4 is a view showing a procedure of generation of low-pass component data and DC component data of the second hierarchy.

The frequency converter 12 performs frequency conversion on the DC component data of the first hierarchy DA01 to DA16 outputted from the frequency converter 11, to output DC component data of the second hierarchy DB (see FIG. 4) and AC component data of the second hierarchy LP (see FIG. 4).

The DC component data of the second hierarchy DB corresponds to a DC component in the HD Photo format. The AC component data of the second hierarchy LP corresponds to a "Low Pass" component in the HD Photo format. Hereinafter, the DC component data of the second hierarchy DB is referred to simply as "DC component data DB" and the AC component data of the second hierarchy LP is referred to as "low-pass component data LP".

The quantization part 13 performs quantization and predictive coding on the DC component data DB, the low-pass component data LP and the high-pass component data HP01 to HP16, to generate quantization data. The quantization data includes DC quantization data, low-pass quantization data and high-pass quantization data corresponding to the respective component data.

The coding part 14 performs entropy coding on the quantization data, to generate the compressed image data. The compressed image data is outputted as a bit stream 80 on a macroblock-by-macroblock basis. Further, the coding part 14 is a characteristic feature of the image compression apparatus 1 and detailed description will be made later.

Hereinafter, discussion will be made on an operation flow of a compression process on the still image data in the image compression apparatus 1. The following operation is common to all the color channels, insofar as no mention is made of any one of color channels.

The still image data inputted to the image compression apparatus 1 is subjected to color conversion, filtering and the like in a not-shown preprocessing part. If the still image data is in the RGB format, it is converted into a YUV444 format by color conversion.

The frequency converter 11 performs frequency conversion on the still image data after being subjected to the preprocessing on a block-by-block basis, to generate the DC component data of the first hierarchy DA01 to DA16 and the high-pass component data HP01 to HP16. The DC component data of the first hierarchy DA01 to DA16 and the high-pass component data HP01 to HP16 are outputted on a macroblock-by-macroblock basis.

Figure 2:
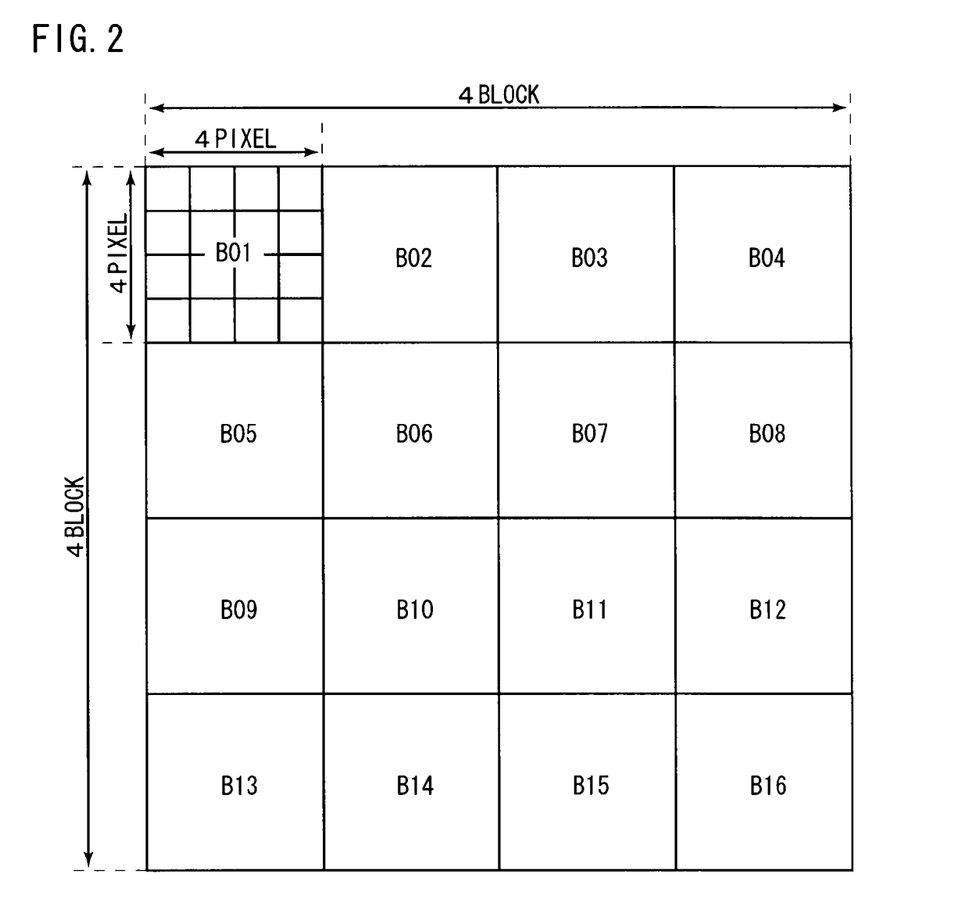
FIG. 2 is a view showing blocks and a macroblock, each of which is a unit of processing on still image data.

FIG. 2 is a view showing a structure of a macroblock. As shown in FIG. 2, one block consists of 4×4 pixels (16 pixels). One macroblock consists of 4×4 blocks (16 blocks). In other words, one macroblock consists of 16×16 pixels (256 pixels). In FIG. 2, the blocks constituting the macroblock are represented by B01, B02 ... B16, from the upper left toward right side.

FIG. 3 is a conceptual view showing the DC component data of the first hierarchy DA01 to DA16 and the high-pass component data HP01 to HP16. As shown in FIG. 3, the DC component data of the first hierarchy DA01 to DA16 and the high-pass component data HP01 to HP16 are generated on a block-by-block basis. The high-pass component data HP01 to HP16 correspond to the blocks B01 to B16, respectively. The DC component data of the first hierarchy DA01 to DA16 each have one piece of conversion factor data. The high-pass component data HP01 to HP16 each have fifteen pieces of conversion factor data.

Next, the frequency converter 12 extracts the DC component data of the first hierarchy DA01 to DA16 and performs frequency conversion of the second hierarchy on the DC component data of the first hierarchy DA01 to DA16. FIG. 4 is a view showing a change of data due to the frequency conversion of the second hierarchy. By the frequency conversion of the second hierarchy, the DC component data DB and the low-pass component data LP are generated. The DC component data DB has one piece of conversion factor data and the low-pass component data LP has fifteen pieces of conversion factor data.

Thus, the frequency conversion of the first hierarchy is performed on the still image data and the frequency conversion of the second hierarchy is performed on the DC component data of the first hierarchy DA01 to DA16. Thus, the image compression apparatus 1 performs frequency conversion hierarchically on the still image data on a macroblock-by-macroblock basis, to generate the DC component data DB, the low-pass component data LP and the high-pass component data HP01 to HP16.

The quantization part 13 performs quantization and predictive coding on the respective conversion factor data of the DC component data DB, the low-pass component data LP and the high-pass component data HP01 to HP16. The quantization data is thereby generated on a macroblock-by-macroblock basis. The quantization data includes the DC quantization data and the low-pass quantization data corresponding to the DC component data DB and the low-pass component data LP, respectively, and the respective high-pass quantization data for the blocks corresponding to the high-pass component data HP01 to HP16.

The coding part 14 extracts coding object data and additional data for all the components from the quantization data. The coding object data is data to be entropy coded and includes DC coding object data, low-pass coding object data and high-pass coding object data. The additional data is data to be used for generation of a flex bit to be added to the coded data and includes DC additional data, low-pass additional data and high-pass additional data. Hereinafter, when the high-pass coding object data and the high-pass additional data corresponding to the blocks are generally termed, these are referred to simply as the "high-pass coding object data" and the "high-pass additional data".

The coding part 14 performs entropy coding on the coding object data for all the components, to generate DC coded data, low-pass coded data and high-pass coded data. From the additional data for all the components, a DC flex bit, a low-pass flex bit and a high-pass flex bit are generated. The coding part 14 further generates pattern information 811, 821 and 831 each indicating whether the value of the coding object data for the corresponding component is "0" or not.

The coding part 14 outputs the pattern information for all the components, the coded data for all the components and the flex bits for all the components in a predetermined order, to generate the bit stream 80 corresponding to one macroblock. The bit streams 80 are outputted in succession and the compressed image data is thus outputted from the image compression apparatus.

Next, the coding part 14, which is a characteristic feature of the present invention, will be discussed in detail.

Figure 5:
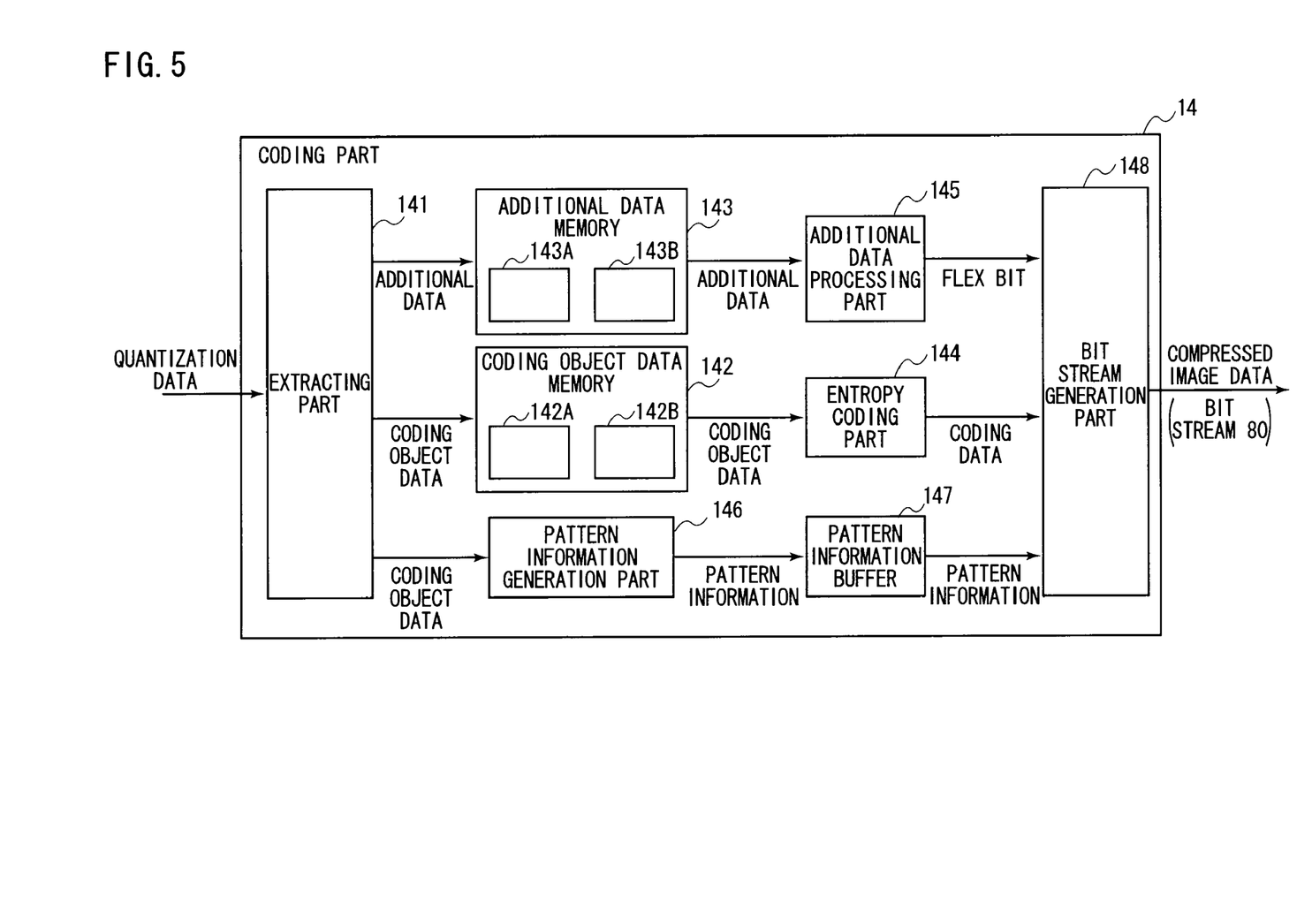
FIG. 5 is a view showing a constitution of a coding part in accordance with the preferred embodiment of the present invention.

FIG. 5 is a block diagram showing a constitution of the coding part 14. The coding part 14 comprises an extracting part 141, a coding object data memory 142, an additional data memory 143, an entropy coding part 144, an additional data processing part 145, a pattern information generation part 146, a pattern information buffer 147 and a bit stream generation part 148.

The extracting part 141 extracts the coding object data and the additional data for all the components from the quantization data.

The coding object data memory 142 stores the coding object data extracted by the extracting part 141 into any one of single port memories 142A or 142B. The additional data memory 143 stores the additional data extracted by the extracting part 141 into any one of single port memories 143A and 143B.

The entropy coding part 144 performs entropy coding on the coding object data for all the components, to generate the DC coded data, the low-pass coded data and the high-pass coded data. The additional data processing part 145 generates the DC flex bit, the low-pass flex bit and the high-pass flex bit from the additional data for all the components.

The pattern information generation part 146 generates the pattern information 811, 821 and 831 corresponding to the DC component, the low-pass component and the high-pass component, respectively, from the coding object data for these components. The pattern information buffer 147 stores the pattern information 811, 821 and 831. Further, the pattern information generation part 146 acquires the coding object data for all the components directly from the extracting part 141, unlike the background-art pattern information generation part 946 which reads the coding object data out from the coding object data memory 942.

The bit stream generation part 148 outputs the coded data, the flex bits and the pattern information for all the components in a predetermined order, to generate the bit stream 80.

Figure 6:
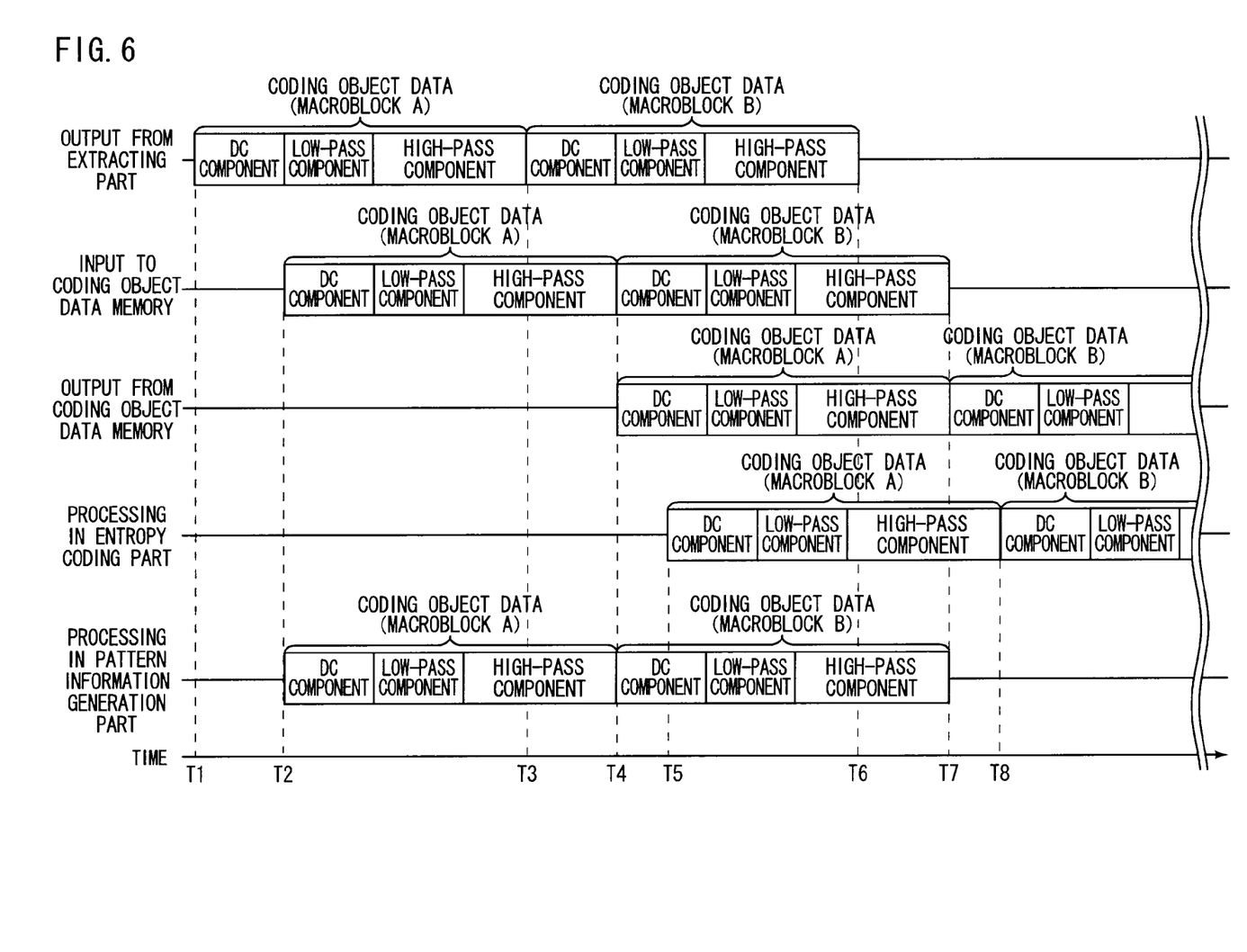
FIG. 6 is a chart showing an operation timing in the coding part in accordance with the preferred embodiment of the present invention.

Hereinafter, the operation of the coding part 14 will be discussed in detail, referring to FIG. 6. FIG. 6 is a time chart showing an operation timing of each data in the coding part 14. As shown in FIG. 6, in the coding part 14, the processing of the entropy coding part 144 and the processing of the pattern information generation part 146 are performed concurrently.

First, the quantization data corresponding to a macroblock A is inputted to the coding part 14. The extracting part 141 extracts the coding object data and the additional data for all the components from a quantization data corresponding to the macroblock A.

For example, the extracting part 141 extracts low order data having a predetermined data length from the lowest order from the fifteen pieces of quantization factor data included in the low-pass quantization data and extracts the remainder other than the low order data out of the fifteen pieces of quantization factor data as high order data. The extracted fifteen pieces of high order data become low-pass coding object data and the extracted fifteen pieces of low order data become low-pass additional data.

Similarly, the extracting part 141 extracts the DC coding object data and the DC additional data from the DC quantization data. The DC coding object data has one piece of high order data and the DC additional data has one piece of low order data. Further, the extracting part 141 extracts the high-pass coding object data and the high-pass additional data from the high-pass quantization data. From the high-pass quantization data, sixteen pieces of high-pass coding object data and sixteen pieces of high-pass additional data corresponding to all the blocks are generated. Each high-pass coding object data has fifteen pieces of high order data and each high-pass additional data has fifteen pieces of low order data. Further, the data length of the low order data depends on the color channel and the component, which is set in the extracting part 141 in advance.

The extracting part 141 outputs a coding object data corresponding to the macroblock A to the coding object data memory 142 and the pattern information generation part 146 during the period from the time T1 to the time T3. Though not shown in FIG. 6, an additional data corresponding to the macroblock A is outputted to the additional data memory 143.

The pattern information generation part 146 generates a pattern information 811, 821 and 831 corresponding to the macroblock A from the inputted coding object data during the period from the time T2 to the time T4. Specifically, the coding object data corresponding to the macroblock A is inputted from the extracting part 141 directly to the pattern information generation part 146. Therefore, in the pattern information generation part 146, there occurs no standby time due to the input of the coding object data corresponding to the macroblock A to the entropy coding part 144.

The pattern information buffer 147 stores the pattern information 811, 821 and 831 corresponding to the macroblock A during the period until the coded data and the flex bits corresponding to the macroblock A are generated. This is because the coded data and the flex bits corresponding to the macroblock A are not generated yet at the point of time (T4) when generation of the pattern information 811, 821 and 831 corresponding to the macroblock A is completed. Further, since the pattern information 811, 821 and 831 corresponding to the macroblock A is stored in the pattern information buffer 147, the pattern information generation part 146 can immediately start to generate pattern information 811, 821 and 831 corresponding to the next macroblock B.

The coding object data corresponding to the macroblock A are written into the single port memory 142A of the coding object data memory 142 during the period from the time T2 to the time T4. The entropy coding part 144 sequentially reads out a DC coding object data, a low-pass coding object data and a high-pass coding object data corresponding to the macroblock A during the period from the time T4 to the time T7. Since the pattern information generation part 146 acquires the coding object data corresponding to the macroblock A directly from the extracting part 141, there occurs no standby time in the entropy coding part 144.

The entropy coding part 144 perform entropy coding of the DC coding object data, to generate the DC coded data. Similarly, the entropy coding part 144 generates the low-pass coded data and the high-pass coded data from the low-pass coding object data and the high-pass coding object data, respectively. The generated DC coded data, low-pass coded data, high-pass coded data are sequentially outputted to the bit stream generation part 148.

Figure 7A:
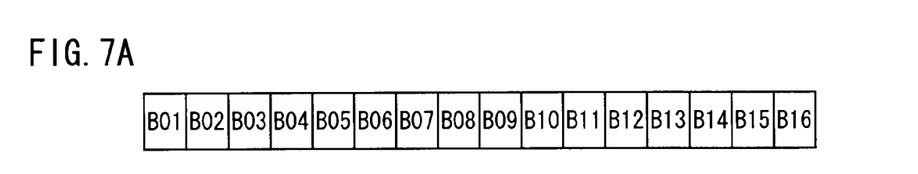
FIGS. 7A and 7B are views showing a rearrangement of high-pass coding object data and high-pass additional data.
Figure 7B:
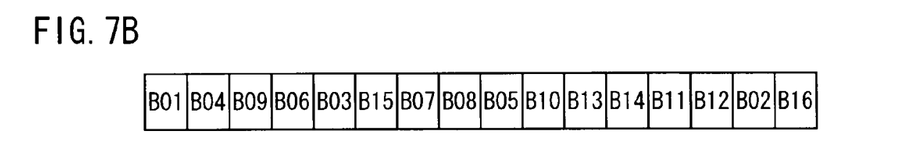

Further, the entropy coding part 144 rearranges the high-pass coding object data on a block-by-block basis in performing entropy coding on the high-pass coding object data. FIGS. 7A and 7B are views showing a rearrangement of the high-pass coding object data.

As shown in FIG. 7A, in the state before the rearrangement, the high-pass coding object data are arranged in the order of block numbers. The entropy coding part 144 stores order information indicating the order of rearrangement of the blocks in advance and rearranges the high-pass coding object data on a block-by-block basis on the basis of the order information. The order information is generated on the basis of the HD Photo format. Consequently, the high-pass coding object data are arranged in such an order as shown in FIG. 7B. The order of rearrangement of the high-pass coding object data is not changed on the basis of the respective values of the high order data included in the high-pass coding object data and is always constant. Further, the rearrangement of the high-pass coding object data is common to all the color channels.

Though not shown in FIG. 6, during the period from the time T2 to the time T4, the additional data corresponding to the macroblock A are written into the single port memory 143A of the additional data memory 143. Then, during the period from the time T4 to the time T7, the additional data processing part 145 arranges the low order data included in the additional data for all the components in a predetermined order, to generate the flex bits for all the components. Further, the additional data processing part 145 stores the same order information as the entropy coding part 144 does. The additional data processing part 145 rearranges the high-pass additional data corresponding to all the blocks on a block-by-block basis on the basis of the order information, like the above-discussed rearrangement of the high-pass coding object data.

The bit stream generation part 148 outputs the pattern information 811, the DC coded data and the DC flex bit corresponding to the macroblock A, to thereby output a DC component stream 81. Similarly, the bit stream generation part 148 outputs a low-pass component stream 82 and a high-pass component stream 83, and thus the bit stream 80 corresponding to the macroblock A is outputted from the coding part 14.

Thus, the entropy coding part 144 acquires the coding object data corresponding to the macroblock A from the single port memory 142A while the pattern information generation part 146 acquires the coding object data corresponding to the macroblock A directly from the extracting part 141. Therefore, in the entropy coding part 144 and the pattern information generation part 146, there occurs no standby time due to acquisition of the coding object data. Further, before the entropy coding part 144 starts entropy coding of the coding object data corresponding to the macroblock A, generation of the pattern information 811, 821 and 831 corresponding to the macroblock A is completed. Therefore, the coding part 14 can efficiently output the bit stream 80 corresponding to the macroblock A.

Next, to the coding part 14, the quantization data corresponding to the macroblock B is subsequently inputted after the input of the quantization data corresponding to the macroblock A. The extracting part 141 extracts the coding object data and the additional data from the quantization data corresponding to the macroblock B.

During the period from the time T3 to the time T6, a coding object data corresponding to the macroblock B is outputted to the coding object data memory 142 and the pattern information generation part 146. At the same time, the additional data corresponding to the macroblock B is outputted to the additional data memory 143.

During the period from the time T4 to the time T7, the pattern information generation part 146 generates a pattern information 811, 821 and 831 corresponding to the macroblock B. Since the coding object data corresponding to the macroblock B is inputted, subsequently, after the coding object data corresponding to the macroblock A is inputted to the pattern information generation part 146, there occurs no standby time in the pattern information generation part 146.

During the period from the time T4 to the time T7, the coding object data corresponding to the macroblock B is written into the single port memory 142B of the coding object data memory 142. The entropy coding part 144 starts to read the coding object data corresponding to the macroblock B from the time T7. Further, the time T7 is the time when reading of the coding object data corresponding to the macroblock A is completed. In other words, there occurs no standby time in the entropy coding part 144 when the processing on the coding object data corresponding to the macroblock B starts. The entropy coding part 144 starts entropy coding of the coding object data corresponding to the macroblock B from the time T8.

Though not shown in FIG. 6, during the period from the time T4 to the time T7, an additional data corresponding to the macroblock B is written into the single port memory 143B of the additional data memory 143. The additional data processing part 145 starts to read the additional data corresponding to the macroblock B out from the single port memory 143B from the time T7 and starts to generate a flex bits corresponding to the macroblock B from the time T8.

The bit stream generation part 148 outputs the bit stream 80 corresponding to the macroblock B subsequently after the output of the bit stream 80 corresponding to the macroblock A.

Hereinafter, though not shown in FIG. 6, the coding part 14 performs the processing on the quantization data corresponding to another macroblock after the processing on the quantization data corresponding to the macroblock B. Thus, the bit streams 80 corresponding to all the macroblocks are successively generated, and the compressed image data is thereby outputted from the image compression apparatus.

Further, as shown in FIG. 6, the pattern information generation part 146 generates the pattern information 811, 821 and 831 corresponding to the macroblock B during the period while the entropy coding part 144 performs the processing on the coding object data corresponding to the macroblock A. Therefore, the entropy coding part 144 can start the processing on the coding object data corresponding to the macroblock B immediately after the entropy coding on the coding object data corresponding to the macroblock A. Therefore, the coding part 14 can efficiently generate the bit streams 80 corresponding to all the macroblocks.

Hereinafter, discussion will be made on the detail of the pattern information 811, 821 and 831 and generation thereof.

The pattern information 811 corresponding to the DC component has pattern values each indicating whether the DC coding object data for each color channel is "0" or not. The data length of the pattern information 811 is 3 bits (see FIG. 9) and each bit corresponds to the pattern value for the corresponding color channel.

The pattern information generation part 146 holds memory areas corresponding to all the bits of the pattern information 811. When the DC coding object data is inputted, the pattern information generation part 146 checks the value of the high order data included in the DC coding object data for each color channel. The pattern information generation part 146 writes "0" as the pattern value into the memory area at the corresponding address if the value of the high order data is "0" and it writes "1" into the memory area at the corresponding address if the value of the high order data is not "0". The data written in the memory area is stored into the pattern information buffer 147 as the pattern information 811.

The pattern information 821 corresponding to the low-pass component has pattern values each indicating whether the low-pass coding object data for each channel is "0" or not. The data length of the pattern information 821 is 3 bits (see FIG. 9) and each bit corresponds to the pattern value for the corresponding color channel.

The pattern information generation part 146 holds memory areas corresponding to all the bits of the pattern information 821. When the low-pass coding object data is inputted, the pattern information generation part 146 checks the values of the fifteen pieces of high order data included in the low-pass coding object data for each color channel. The pattern information generation part 146 writes "0" as the pattern value into the memory area at the corresponding address if all the values of the fifteen pieces of high order data are zero and it writes "1" into the memory area at the corresponding address if any one piece of high order data having a value of not "0" is found. The data written in the memory area is stored into the pattern information buffer 147 as the pattern information 821.

The pattern information 831 corresponding to the high-pass component has pattern values each indicating whether the high order data of the high-pass coding object data for each channel is "0" or not on a block-by-block basis. The data length of the pattern information 831 is 48 bits and 3 bits corresponding to each color channel are allocated to each of the sixteen blocks constituting a macroblock.

The pattern information generation part 146 holds memory areas corresponding to all the bits of the pattern information 831. The pattern information generation part 146 makes reference to the high-pass coding object data on a block-by-block basis. If all the high order data included in the high-pass coding object data corresponding to a block are zero, "0" is written into the memory area at the corresponding address. If any one piece of high order data having a value of not "0" which is included in the high-pass coding object data corresponding to a block is found, "1" is written into the memory area at the corresponding address. Such a processing is performed for each color channel. After writing all the pattern values of the pattern information 831 into the memory areas, the pattern information generation part 146 performs entropy coding on the data written in the memory areas. The entropy coded data is stored into the pattern information buffer 147 as the pattern information 831.

As discussed above, the high-pass coding object data are rearranged on a block-by-block basis in the entropy coding part 144. Therefore, the pattern information generation part 146 changes the arrangement of the pattern values corresponding to all the blocks in accordance with the rearrangement of the high-pass coding object data.

Figure 8:
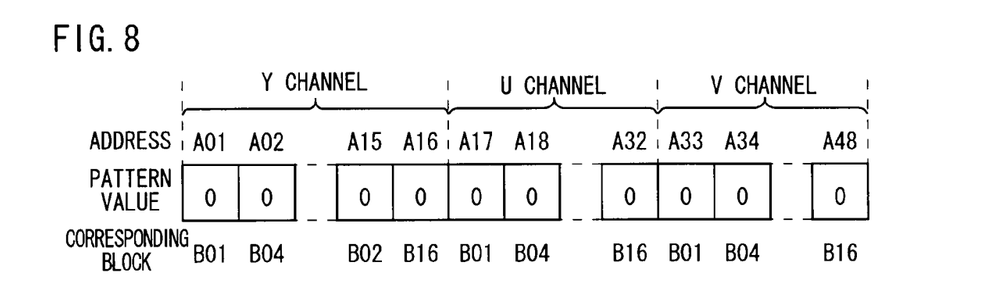
FIG. 8 is a view showing correspondence between addresses of memory areas for pattern information and block numbers.

FIG. 8 is a view showing correspondence between addresses of the memory areas for pattern information 831 and block numbers. The pattern information generation part 146 has memory areas for 48 bits for generation of the pattern information 831. Addresses A01 to A16 correspond to the Y channel, addresses A17 to A32 correspond to the U channel and addresses A33 to A48 correspond to the V channel. Further, the addresses of the memory areas for storing the pattern values are associated with the rearranged block numbers. For example, the addresses A01, A17 and A33 are associated with the block B01 and the addresses A02, A18 and A34 are associated with the block B04.

If fifteen pieces of high order data corresponding to the block B01 for the Y channel are inputted, the pattern information generation part 146 writes the pattern value in accordance with the values of the inputted high order data into the memory area at the address A01. If fifteen pieces of high order data corresponding to the block B02 for the Y channel are inputted, the pattern information generation part 146 writes the pattern value in accordance with the values of the inputted high order data into the memory area at the address A15. Thus, the pattern value in accordance with the values of the high order data included in the high-pass coding object data for each block is written into the memory area at the specified address.

After writing the pattern values for all the blocks into the memory areas, the pattern information generation part 146 sequentially reads the pattern values out from the memory areas, beginning with the address A01. This allows the pattern values for all the blocks to be arranged in the order in accordance with the rearrangement of the high-pass coding object data on a block-by-block basis. The pattern value that is read out is entropy coded and then stored in the pattern information buffer 147 as the pattern information 831.

As discussed above, in the image compression apparatus 1 of this preferred embodiment, the coding object data extracted from the quantization data is inputted to the coding object data memory 142 and the pattern information generation part 146 concurrently. In other words, while the pattern information generation part 946 acquires the coding object data from the coding object data memory 942 in the background art, the pattern information generation part 146 acquires the coding object data directly from the extracting part 141 in this preferred embodiment. For this reason, the entropy coding part 144 does not need to be on standby for reading of the coding object data until the pattern information generation part 146 completes acquisition of the coding object data. Therefore, the entropy coding part 144 can efficiently perform entropy coding on the coding object data.

Further, in this preferred embodiment, the coding part 14 does not have to generate the DC flex bit or the low-pass flex bit. In other words, the DC component stream 81 and the low-pass component stream 82 does not have to include the DC flex bit and the low-pass flex bit, respectively.

While the invention has been shown and described in detail, the foregoing description is in all respects illustrative and not restrictive. It is therefore understood that numerous modifications and variations can be devised without departing from the scope of the invention.

What is claimed is:

1. An image compression apparatus comprising:
 a frequency converter for performing frequency conversion of original image data on a macroblock-by-macroblock basis to generate frequency conversion data;
 a quantization part for performing quantization of said frequency conversion data to generate quantization data; and
 a coding part for generating coded data from said quantization data to output stream data including said coded data,
 wherein said coding part includes
 an extracting part for extracting coding object data which is to be entropy coded, from said quantization data;
 a memory part for storing said coding object data extracted by said extracting part;
 an entropy coding part for reading said coding object data out from said memory part and performing entropy coding of said coding object data which is read out, to generate said coded data;
 a pattern information generation part for acquiring said coding object data from said extracting part to generate pattern information indicating whether value of said coding object data is "0" or not; and
 an output part for outputting said pattern information and said coded data in a predetermined order, to output said stream data.

2. The image compression apparatus according to claim 1, wherein
 said entropy coding part performs entropy coding of first coding object data corresponding to first macroblock and then performs entropy coding of second coding object data corresponding to second macroblock, and
 said pattern information generation part generates pattern information corresponding to said second coding object data during the period while said first coding object data is performed entropy coding.

3. The image compression apparatus according to claim 1, wherein
 said pattern information generation part includes a pattern information memory part for storing said pattern information.

4. The image compression apparatus according to claim 1, wherein
 said extracting part includes an additional data extracting part for extracting data other than said coding object data from said quantization data as additional data;
 said coding part includes an additional data processing part for generating arranged data in which a plurality of data included in said additional data are arranged in a predetermined order, and
 said output part outputs said pattern information, said coded data and said arranged data in a predetermined order, to output said stream data.

5. The image compression apparatus according to claim 1, wherein
 said frequency converter includes
 a first hierarchy converter for performing frequency conversion of said original image data to generate first DC component data and first AC component data; and
 a second hierarchy converter for performing frequency conversion of said first DC component data to generate second DC component data and second AC component data, and
 said frequency converter outputs said second DC component data, said first AC component data, and said second AC component data as said frequency conversion data.

* * * * *